United States Patent [19]

Glasheen

[11] Patent Number: 5,153,512
[45] Date of Patent: * Oct. 6, 1992

[54] SPEED MEASURING SYSTEM UTILIZING MAGNETO-OPTIC SWITCH ACTUATED BY MAGNETIC FIELD ROTATION

[75] Inventor: William M. Glasheen, Derry, N.H.

[73] Assignee: Amespace, Inc., Wilmington, Del.

[*] Notice: The portion of the term of this patent subsequent to Aug. 6, 2008 has been disclaimed.

[21] Appl. No.: 644,020

[22] Filed: Jan. 18, 1991

Related U.S. Application Data

[63] Continuation of Ser. No. 289,845, Dec. 27, 1988, Pat. No. 5,038,102.

[51] Int. Cl.⁵ .................... G01P 3/36; G01D 5/34
[52] U.S. Cl. ................ 324/175; 324/207.13; 250/225
[58] Field of Search ............ 324/244.1, 260, 175, 324/226, 207.13, 207.25; 250/225, 227, 231.13; 350/374, 375, 376

[56] References Cited

U.S. PATENT DOCUMENTS

| | | | |
|---|---|---|---|
| 4,843,232 | 6/1989 | Emo et al. | 324/260 |
| 5,038,102 | 8/1991 | Glasheen | 324/175 |

*Primary Examiner*—Walter E. Snow
*Attorney, Agent, or Firm*—Amster, Rothstein & Ebenstein

[57] ABSTRACT

A Speed Sensor for a rotating member utilizes a magneto optic switch and a magnet mounted in the vicinity of the rotating member. Under normal conditions the magnetic field is at right angles to the axis of sensitivity of the switch thereby blocking light transmission through the switch. When a ferrous tooth on the rotating member passes the sensor, the magnetic field is distorted due to the change in reluctance caused by passage of the tooth thereby generating a magnetic field component along the switch axis of sensitivity turning the switch on and producing an output speed signal.

1 Claim, 1 Drawing Sheet

SPEED MEASURING SYSTEM UTILIZING MAGNETO-OPTIC SWITCH ACTUATED BY MAGNETIC FIELD ROTATION

This is a continuation of co-pending application Ser. No. 289,845 filed on Dec. 27, 1988, now U.S. Pat. No. 5,038,102.

This invention relates to a speed sensor, and, more particularly, to a speed sensor using a magneto optic switch.

BACKGROUND OF THE INVENTION

Speed sensors for aircraft engines and other applications routinely use electromagnetic, variable reluctance techniques. While such sensors are widely used and well-known but they are, however, quite bulky. There is a need for speed sensors which are substantially smaller and less expensive than the electromagnetic, variable reluctance schemes described above. Applicant has discovered an approach to measuring speed through a combination of a variable reluctance magnetic path and magneto-optic transduction in which a ferro magnetic tooth on the rotating member actuates a magneto-optic switch. The use of a magneto-optic switch in conjunction with a high energy, rare earth permanent magnet results in a compact and very effectively speed measuring system.

U.S. Pat. No. 4,818,080 (issued Apr. 4, 1989), entitled "Monolithic Faraday Optical Switch" assigned to the General Electric Company, the Assignee of the instant invention, describes a monolithic Faraday magneto-optic switch in which all of the switch functional elements viz, polarizers, analyzers, Faraday rotator layers, light reflecting surfaces are located on a single substrate. Faraday rotating layers are deposited on the surfaces of an optically inactive substrate. A polarizer-analyzer is deposited in a side-by-side arrangement on one side of the substrate and a non-magnetic, reflector surface is deposited on the other surface. Radiant energy from an input optical fiber is transmitted through the polarizer and through the Faraday rotational layer(s) and the optically inactive substrate to the reflecting surface where it is reflected back to the analyzer. The Faraday layer when subjected to a magnetic field which is orthogonal to its surface, rotates the plane of polarization of the incident radiation. Thus, the presence or absence of the magnetic field controls the optical switching function.

The monolithic-magneto-optic switch element is actuated whenever a magnetically permeable tooth or projection on a rotating member passes by the magnet. The magnet and the switch are so oriented with respect to each other that in the absence of a tooth, there is no magnetic field component at the surface of the switch Faraday layer(s). Whenever a tooth passes by the magnet, the magnetic field is distorted causing the magnetic field vector to shift so that a magnetic field component now exists along the sensitive axis of the magneto-optic switch. This rotates the plane of polarization of the incident light and light passes through the switch.

It is therefore a principal objective of the invention to provide a speed sensor utilizing a Faraday magneto-optic transducing arrangement.

It is a further objective of the invention to produce a small, light weight speed sensor utilizing a Faraday magneto-optic switch.

Yet another objective of the invention is to provide a speed sensor in which passage of the rotating member generates a magnetic field component which actuates a magneto-optic switch to produce an output signal.

Other objectives and advantages of the invention will become readily apparent as the description thereof proceeds.

BRIEF DESCRIPTION OF THE INVENTION

The various objectives and advantages of the invention are realized in an arrangement in which a speed sensor includes a high energy, rare-earth magnet mounted so as to come into flux exchange relationship with a ferromagnetic tooth on a rotating member. At least one (1) magneto optic switch is mounted adjacent to the magnet. The magnetic field vector is usually at right angles to the sensitive axis of the switch and the switch is in the OFF state. Passage of the ferromagnetic tooth past the magnet distorts the magnetic field by establishing a flux return path through the tooth. This distortion, produces a magnetic field component parallel to the sensitive axis of the switch; i.e., a magnetic field component now exists which is at right angles to the Faraday layers of the switch thereby rotating the plane of polarization of the incident radiant energy. This actuates the switch allowing passage of radiant energy through the switch to a remote sensor producing an output signal representative of the rotational speed.

DETAILED DESCRIPTION OF THE INVENTION

Figure 1:
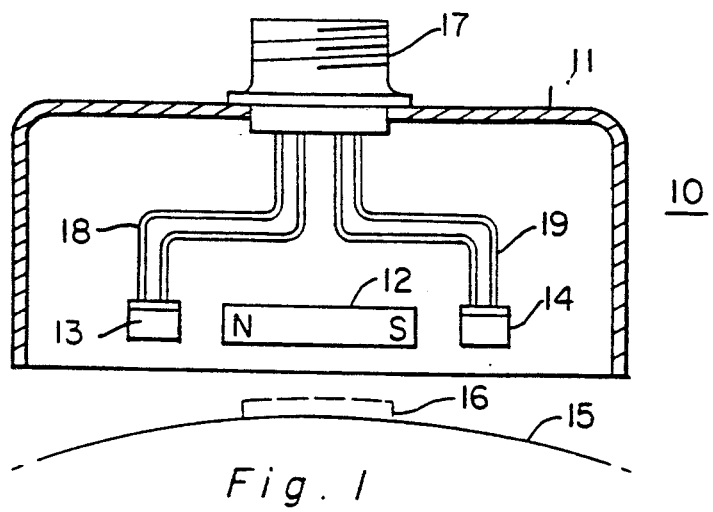
FIG. 1 is a schematic showing of the speed sensor mounted adjacent to a tooth rotating member.

FIG. 1 is an exemplary illustration of a speed sensor according to the invention which includes a magneto-optic switch and a source of magnetic flux; with the flux source and the switch interacting to measure the speed of a rotating member. The rotating member includes a ferromagnetic tooth or projection which distorts the magnetic flux whenever the tooth passes the sensor. The distortion of the magnetic field produces a magnetic field component along the sensitive axis of magneto-optic switch thereby permitting passage of light which is then sensed as an indication of speed of the rotating member.

The speed sensor shown generally at 10 includes a non-magnetic housing 11 of stainless steel or other similar non-magnetic material. Positioned in the housing is a source of magnetic flux in the form of a magnet 12 having a north and south pole orientation as shown in the drawing and a pair of magneto-optic switches 13 and 14 positioned on either side. Magnet 12 is preferably a high energy rare earth magnet such as samarium-cobalt. Rare earth magnets of this type can readily provide flux densities of 1500 to 2000 gauss. By using a rare earth magnet a very small distortion of the magnetic field vector produces magnetic field components along the sensitive axes of the magneto-optical switches 13 and 14 to actuate the switches and permit passage of radiant energy.

Speed sensor 10 is positioned adjacent to a rotating member 15 shown in FIG. 1 as having a projection or tooth 16 extending radially from the surface. Tooth 16 is shown in dashed lines in FIG. 1 to indicate that the tooth passes by the speed sensor during each rotation to distort the flux path from the magnet thereby actuating the magneto-optic switches. The speed sensor of FIG. 1 shows a redundant system with two (2) speed sensors 13 and 14, located on either side of magnet 12, each of which is actuated as tooth 16 passes by. The invention, however, is not limited to a dual magneto-optical switches in that the invention may be readily carried out by a using but a single magneto-optic switch. Optical connector 17 extends into housing 11 and optical fiber pairs 18 and 19 are brought into the housing and into contact with magneto-optic-switches 13 and 14. The optical fibers are brought out of the housing through the connector and thence through an optical cable, not shown, to a remote source of radiant energy and to a remote sensor and signal processing electronics which produce electrical pulses in response to the radiant energy transmitted through the output fiber whenever the tooth passes by the sensor and actuates the switches.

Optical fiber pairs 18 and 19 consist of an input optical fiber and an output optical fiber. The input optical fiber of each pair is brought into contact with the magneto optic switch and illuminates a polarizer element on the upper surface of the switch. The output fiber of each pair is in contact with a crossed analyzer element on the surface of the switch. The presence of a magnetic field along the sensitive axis of the switch as illustrated by the double headed arrows adjacent to each switch rotates the plane of polarization of the radiant energy passing through the magneto-optic switch so that it is reflected and passes through the analyzer element and thence through the output fiber to the signal processing electronics.

The magneto-optic switches 13 and 14, as will be explained in greater detail in connection with FIG. 2 which shows the actual construction, are of a monolithic construction in that all of the functional elements of a Faraday magneto-optic switch are located on a single substrate. That is, the polarizer element, the Faraday rotator element(s) the reflector element and analyzer element are deposited on a single substrate thereby producing an extremely small and efficient magneto-optic switch.

Figure 2:
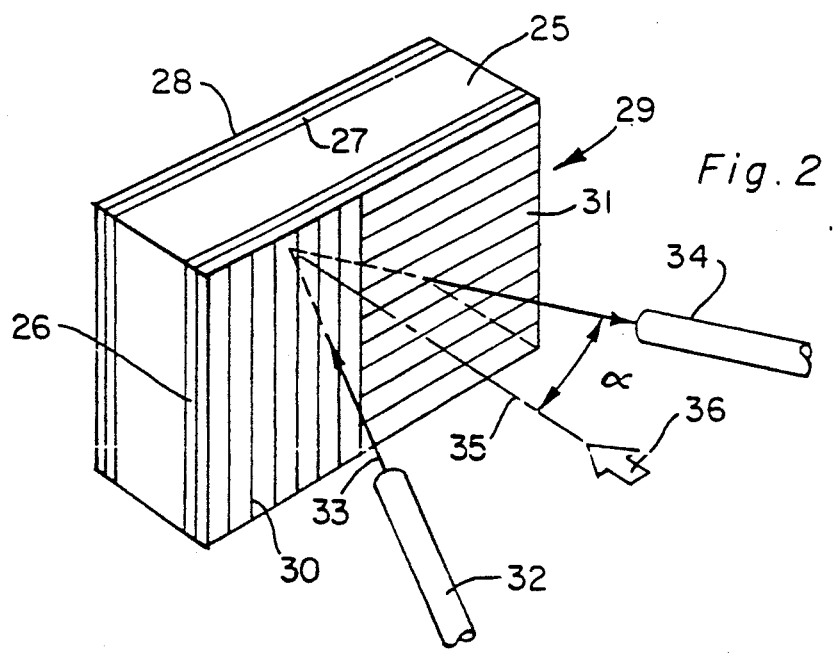
FIG. 2 is a perspective view of the monolithic Faraday optical switch utilized in the speed sensor to produce the magneto-optic switching function.
Figure 3:
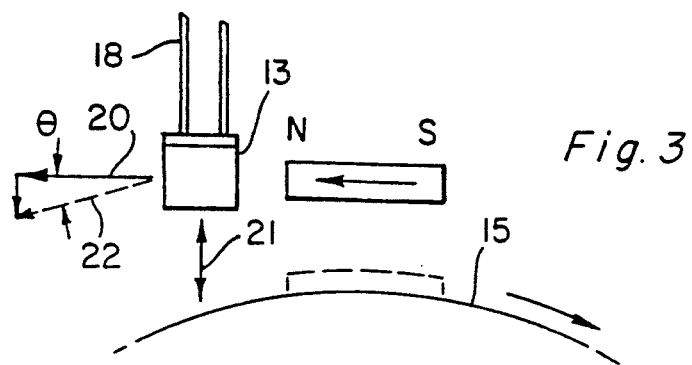
FIG. 3 is a schematic showing the magnetic field vectors as they are affected by the rotating member.

FIG. 3 illustrates, diagrammatically, the manner in which the distortion of the magnetic field caused by passage of the ferrous tooth on the rotating member actuates the magneto-optic switch. Only one magneto-optic switch element 13 is shown in FIG. 3 with an input and output fiber optic pair 18 in contact with one surface of the switch. In the absence of the tooth the reluctance of the air path from the magnet to rotating member 15 is sufficiently high so that the magnetic flux does not pass through the rotating member. The flux path between the north and south poles of the magnets is such as to establish a magnetic field vector along axis 20 which is orthogonal to the sensitive axis 21 of the magneto-optic switch. As a result, the magnetic field has no effect on the switch 13 and radiant energy from the input fiber is blocked by the switch. Whenever the tooth 16 passes beneath the magnet the air gap between the tooth 16 and the magnet is substantially reduced and part of the magnetic flux passes through the tooth thereby distorting the magnetic field moving the magnetic field vector by an angle $\theta$. The axis of the magnetic field vector is now shown by the dashed arrow 22. With the magnetic field axis shifted through the angle $\theta$, there is now a magnetic field component proportional to sin $\theta$ along the axis of sensitivity of the switch. This magnetic field component actuates the switch by rotating the polarization of the incident radiation. As will be pointed out in greater detail in connection with FIG. 2, Faraday rotator materials are available with very high Verdet constants that saturate at about 200 gauss and at this flux density produce high rotational angles, per unit thickness, (On the order of 1° per micron.) Thus, with rare earth magnets having field strengths of 1500 to 2000 gauss, rotating the magnetic field vector through 5 to 10° is more than adequate to produce a magnetic field component of 200 gauss along the sensitive axis of the switch.

FIG. 2 illustrates the construction of the monolithic magneto-optic switch utilized in the speed sensor of FIG. 1. The monolithic magneto-optic switch shown in FIG. 2 is the basis of the aforementioned U.S. Pat. No. 4,818,080 issued in the name of the instant inventor. The Monolithic magneto-optic switch of FIG. 2 includes an optically inactive substrate 25 which is preferably a single crystal substrate of gadolinium, gallium, garnet though other mixed crystal garnet substrates may be used with equal effectiveness. The term "optically inactive" is used in the sense that the substrate is transparent to plane polarized energy but does not affect the plane of polarization. Positioned on opposite sides of the substrate 25 are Faraday rotator layers 26 and 27. The rotator layers are preferably bismuth doped gadolinium, iron garnet, layers which are grown on the substrate by liquid phase epitaxy so that the rotator layers have the same crystalline orientation as the substrate. Layers 26 and 27 are Faraday rotators in the sense that the plane of polarization of radiant energy passing through such a layer in a direction parallel to a magnetic field, is rotated by an amount dependent on the Verdet constant (°/unit thickness) of the layer and on the thickness of the layer. The Verdet constant of bismuth doped gadolinium iron garnet Faraday rotators is very high. Materials having angular rotations of one degree (1° per micron at a magnetic field strengths of 203 gauss at a wave length of 850 nanometers are commercially available. Consequently, 90° rotation of the incident plane polarized radiation can be achieved with a rotator thickness of roughly 90 microns.

A non-magnetic light or radiation reflecting layer 28 (of silver or aluminum for example) is deposited over Faraday rotator layer 27. Deposited on the front surface of the substrate over rotator layer 26 is a polarizer/analyzer pair shown generally at 29 and which preferably consists of a pair of crossed polarizer and analyzer elements mounted in a side-by-side configuration. Polarizer/analyzer pair 29 thus consists of polarizer 30 shown as a vertical polarizer so that only vertically plane polarized components of incident unpolarized energy pass through the polarizer. Analyzer element 31 positioned adjacent to polarizer 30 is oriented to permit passage of horizontally polarized components. Polarizer elements 30 and 31 are deposited over rotator layer 26 by any one of a number of well-known deposition techniques.

The Faraday optical switch is illuminated by a beam of radiant energy; with the term "radiant energy" used in its broadest sense to include electromagnetic energy both in and out of the visible spectrum. The radiant energy from a remote source not shown, which illuminates the polarizer 30 comes from input optical fiber 32. Input fiber 32 is typically a 100 micron core diameter optical fiber surrounded with the customary reflective and cladding layers, etc. Input fiber 32 is positioned to illuminate polarizer element 30 with radiation illustrated by the arrow 33. Input fiber 32 as well as output fiber 34 positioned adjacent to analyzer 31 are displaced from a normal or orthogonal axis 35, which axis represents the axis of the applied magnetic field 36, by an angle α. Input and output fibers 32 and 34 are positioned directly against polarizer 30 and analyzer 31 by an adhesive or by retaining the optical fiber ends in a ferrule which is positioned against the polarizer/analyzer elements.

Vertically plane polarized energy exiting from polarizer 30 passes through Faraday rotator layer 26, substrate 25 to Faraday layer 27. After passing through layer 27 the light is reflected from layer 28 back through the rotator layers and the substrate to analyzer 31. Plane polarized radiation which is rotated by 90° as shown by the arrow 37 passes through analyzer 31, and thence to output fiber 34 and is transmitted to the remotely located detector and signal processing electronics to produce output pulses which are an indication of the condition represented by the presence of the magnetic field which in the instant case is the passage of the ferrous tooth, thus making the pulse repetition frequency a measure of the speed of the rotating member.

If rotation of the plane of polarization is less than 90° only a portion of the incident radiation is horizontally polarized and only a portion of the incident energy passes through analyzer 31. In the absence of a magnetic field the degree of rotation is 0° or very close to 0° and the vertically incident radiation is not rotated so that virtually all of the reflected radiation is blocked by analyzer 31. In the presence of a magnetic field, the incident radiation is rotated so that some of the radiation which illuminates the back of the analyzer 31 is now horizontally polarized and all or a substantial portion, (depending on the degree of rotation) passes through analyzer and is received by output optical fiber 34.

Optically inactive crystalline substrates of gadolinium, gallium garnet having Faraday rotator layers of bismuth doped gadolinium iron garnet deposited on the surface are commercially available. For example, such substrates are available from Airtron Division of Litton Industries 200 E. Hanover Avenue Morris Plains, N.J. 07950 under its trade designation LLC 120. The LLC 120 substrate/rotator is approximately 0.5 mm thick and has 21.7 micron layers of bismuth doped gadolinium on each surface.

An LLC 120 polarization rotator was tested when illuminated by radiant energy at a wave length of 850 nanometer and produced a rotation of 1° per micron at a field of 203 gauss. In passing through the 21.7 micron layers four (4) times; i.e., initially passing through layers 26 and 27 and then being reflected back through these layers to the analyzer, the vertically polarized incident energy is rotated by 87° so that virtually all of the incident radiation passes through analyzer 31. Obviously, by adjusting the thickness of the Faraday rotator layer, for any offset angle α, 90° rotation of the polarized light or rotations very close to 90° may be easily achieved. Thus, a very small, (less than 1 mm thick) monolithic optical switch is possible in which all of the functional elements of a Faraday Magneto-Optic switch are mounted on a single substrate. This, of course, results in a speed sensor which is very small, and very light; all of which are important considerations in aircraft uses, where space and weight are usually at a premium.

As will now be apparent, a small, light weight speed sensor construction has been illustrated in which the rotating element distorts a magnetic field associated with the sensor during each rotation. Distortion of the magnetic field produces a magnetic component along the sensitive axis of one or more magneto-optic switches mounted in the sensor. This magnetic field actuates the switch during each rotation to permit passage of light through the switch which light is then detected to provide a signal which is an indication of the speed of the rotating device While the instant invention has been described in connection with a preferred embodiment thereof, the invention itself is by no means limited thereto since many modifications in the instrumentalities employed may be made without departing from the true spirit and scope of the invention.

What is claimed as new and desired to be secured by U.S. Letters Patent is:

1. A system for measuring speed comprising:
    (a) a sensor having at least one magneto-optic switch and a source of magnetic flux, said source of magnetic flux generating a magnetic field oriented in a first direction substantially orthogonal to the sensitive axis of said magneto-optic switch to cause said switch to be in a first condition;
    (b) a ferromagnetic member; and
    (c) means for mounting said ferromagnetic member and said sensor for relative movement therebetween, wherein the direction of said magnetic field with respect to said sensitive axis of said magneto-optic switch changes when said ferromagnetic member is proximate said switch to cause said switch to be in a second condition, providing thereby an indication of the relative speed between said sensor and said ferromagnetic member.

* * * * *